Feb. 2, 1937. F. C. AXTELL 2,069,206
METHOD AND APPARATUS FOR RECOVERING PRECIOUS METAL FROM ORE
Filed Aug. 16, 1933
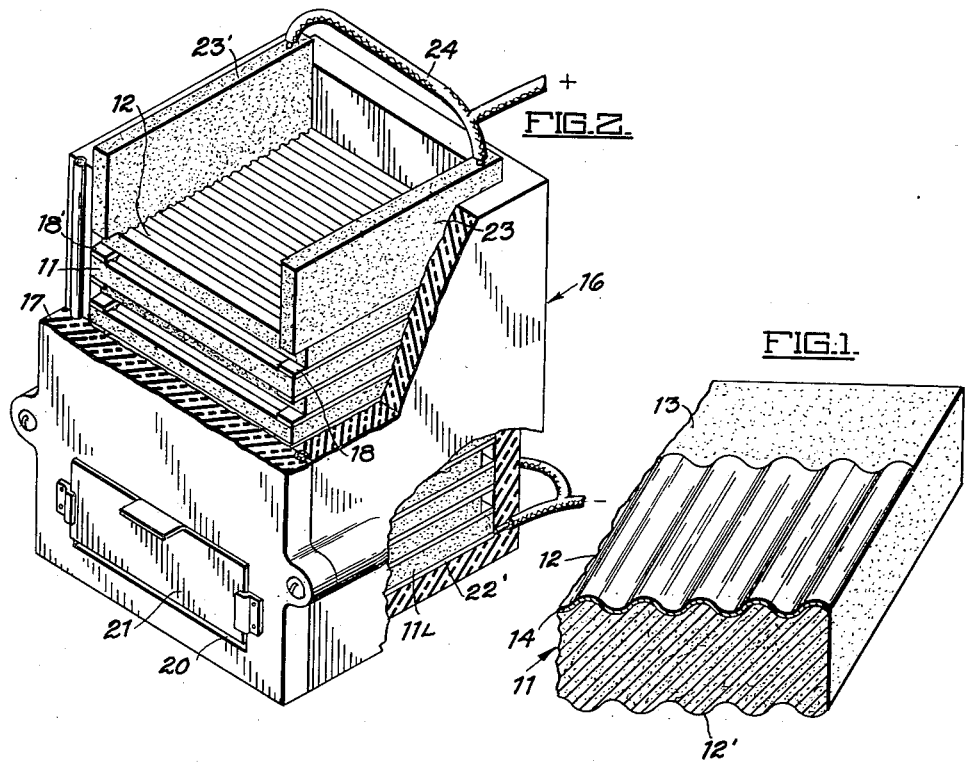
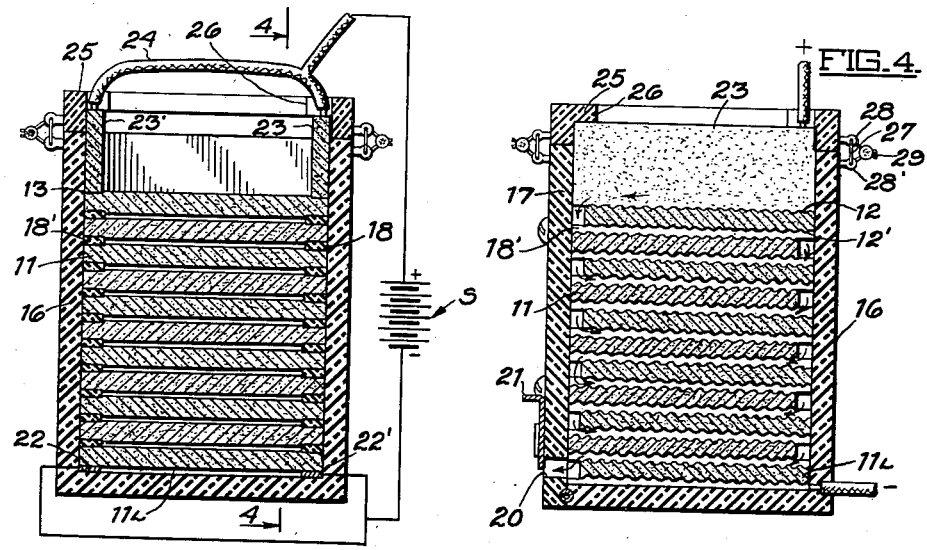
INVENTOR
FRANK C. AXTELL
BY
ATTORNEY Patented Feb. 2, 1937

2,069,206

UNITED STATES PATENT OFFICE 2,069,206

METHOD AND APPARATUS FOR RECOVERING PRECIOUS METAL FROM ORE

Frank C. Axtell, Pasadena, Calif., assignor of three-fourths to Harold Whealton, Los Angeles, Calif.

Application August 16, 1933, Serial No. 685,364

16 Claims. (Cl. 209—179)

This invention has to do in a general way with a method and apparatus for winning or recovering precious metal, such as gold, silver, platinum, etc., from finely divided ores or from finely divided earthy, siliceous, or mineral deposits in which they are contained.

The invention is more particularly related to improvements in methods for recovering such metals from their ores by means of amalgamation, that is, by causing these metals to combine with mercury.

At present, the method generally employed for this purpose, consists in passing the finely divided ores suspended in water over amalgamated copper plates, during which operation the free metals contained in the ore combine with, or are amalgamated by, the free mercury or the amalgam with which the copper plates are coated, and are thus separated from the relatively great mass of inactive or invaluable matter constituting the bulk of the ore.

The method just described possesses inherent defects, and its operation is subject to certain difficulties, some of which are: first, the necessity for frequent and laborious "dressing" of the plates in order to restore or maintain their activity which is impaired by the chemical action of certain ingredients in the ore; second, the fact that some varieties of native gold will not, in the conventional process outlined above, combine or amalgamate with mercury; and, third, the necessity for removing the gold amalgam from the plates by scraping and brushing, all of which defects and difficulties result in loss of efficiency and increased cost of recovery, as is well understood by those familiar with the art.

It is a primary object of this invention to produce a novel plate or block which is adapted for use in a process of the general character referred to above, and which is of a nature such that the necessity for dressing the plates is entirely eliminated.

It is a further object of this invention to produce a novel method and apparatus for use in conjunction with the plate of the class described whereby the varieties of native gold referred to above, which will not combine or amalgamate in the conventional process first referred to, can be successfully and completely extracted.

It is a still further object of this invention, to produce a plate of the class described whereby the recovered values can be quickly and completely removed without the usual scraping and brushing ordinarily employed in the conventional methods.

It is another object of this invention to provide an apparatus of the class described which can be successfully and conveniently sealed or locked so that the danger of theft by the operators is eliminated.

In line with these objects, I have developed a novel type of plate or other form which is especially adapted for use in processes of the general character above referred to. This plate consists in a general way of a graphite or carbon plate, the surface of which is amalgamated, or, more specifically, is provided with a coating of metal alloyed or otherwise coated with mercury.

By the term graphite or carbon, I refer to the substances sold under these names in commerce and in general use in the electrical industries. One form of graphite which is known to the trade as "Acheson Graphite" is preferred to the ordinary carbon for the purposes hereinafter described by reason of its superior properties, although carbon is an equivalent of this graphite for this purpose, and I claim its use.

Broadly, the plates contemplated by this invention, may be formed of electrically conductive material, preferably non-metallic in character, which is chemically inert with respect to a reagent which will attack or dissolve the metallic base of the coating above referred to.

By the term "plate", as used herein, it is to be understood that I refer to any desired form or shape in which the material may be molded or cast, or otherwise constructed.

In carrying out my invention, I first coat or cover the surface of the graphite or carbon plate with an electro—or other deposit of a metal such as copper, zinc, silver, etc., in fact, practically any of the stable metals will serve, although for obvious reasons I prefer to use such metals as zinc or copper.

The thickness of the metallic deposit may be of the order of from one to five thousandths of an inch, but it will be understood that any thickness may be employed which will best meet the working conditions. The metallic surface thus formed is then subjected to a preliminary or primary amalgamation by treating the same with a solution of salt or compound of mercury, preferably by immersing the plate in an aqueous solution of the double cyanide of mercury and potassium or mercury and sodium. As an alternative, this primary amalgamation may be effected by using the metallic surface of the plate as a cathode in an electrolytic solution containing mercury. In any event the result is a very perfectly amalgamated metallic surface which adheres with great tenacity to the carbon or graphite upon which it is deposited. The plates which have been coated with an amalgamated metallic surface of this character are in a condition suitable for use in any apparatus designed for the recovery of precious metals by amalgamation, with several inherent advantages over the conventional copper plates, which will be hereinafter more fully discussed.

In addition to the plates, however, I have devised a novel method and apparatus in which they are especially adapted for use. In this connection, my invention contemplates a method and apparatus which combines electrolysis with amalgamation and an apparatus wherein this method can be conveniently and efficiently practiced.

The general construction of this last mentioned type of apparatus comprises a box or case formed of insulating material and containing a plurality of superimposed plates of the type above referred to, which are held in spaced relation with each other by spacing means of insulating material. The plates are arranged in staggered relation to each other, so that a liquid suspension of the material delivered into the top of the cell flows downwardly and back and forth between the various plates until it is discharged from the lower end portion of the case. During this operation, the top and bottom plates of the cell are connected across an electric circuit in a manner such that the metal coated surfaces of the plates form the cathodes and the uncoated surfaces the anodes of a series cell.

The details in the method and a preferred form of apparatus for practicing the same will be best understood from the following description of the accompanying drawing which is chosen for illustrative purposes only, and in which—

Fig. 1 is an enlarged perspective view showing a segment of a preferred form of plate contemplated by this invention;

Fig. 2 is a perspective view with parts broken away showing a preferred form of cell contemplated by this invention;

Fig. 3 is a sectional elevation taken through the cell shown in Fig. 2; and

Fig. 4 is a sectional elevation which may be considered as having been taken in a plane represented by the line 4—4 in Fig. 3.

More particularly describing the invention as herein illustrated, reference numeral 11 indicates a plate which is formed of carbon graphite or other suitable material and is shown as having ribbed or corrugated surfaces 12 and 12'. The margins and edges of these plates are preferably ground or otherwise finished to the exact dimensions required, and the side margins of the plates as indicated at 13, are either ground flat or cast flat so as to provide smooth bearing or supporting surfaces.

In place of being ribbed or corrugated, the surfaces 12 and 12' of the plates may be furnished with depressions or pockets designed to hold an excess of mercury or amalgam. Any desired number of these plates formed in this manner are then coated or covered upon one side only, as indicated at 14, with a metal, such for example as zinc. This coating may be applied in any suitable manner, such as by electrodeposition as explained above, and the metallic surfaces thus formed are subjected to the preliminary or primary amalgamation hereinbefore described.

The amalgamated surfaces formed in this manner are then charged with a further quantity of mercury in the metallic state, any excess thereof being retained by the hollows or depressions of the corrugated surfaces which thus present an excellent mercurial surface for the amalgamation of free metals. In this connection it is to be understood that while I have herein described and illustrated the plates as being corrugated, that any other form of irregularities or depressions may be provided or the plates may be made substantially flat.

With regard to the manner of applying the metallic coating, it should be pointed out that the electro-deposited metals appear to combine or amalgamate with mercury with much greater facility than do the same metals when in the form of castings, rolled sheets, etc., and they further seem to have the effect of greatly lowering the surface tension of the mercury.

As mentioned above, the plate or plates prepared in this manner may be used with certain advantages in the conventional process of extracting metals by amalgamation, but I prefer to employ them in a novel type of apparatus which is exemplified in Figs. 2 to 4 inclusive wherein reference numeral 16 indicates a cell or box composed of insulating material such as rubber and shown as having an open top and a removable side closure 17.

In this particular form of the invention, the plates 11 are formed with one dimension equal to one dimension of the box, and the other slightly shorter than the other dimension of the box so that they can be superimposed with insulating strips 18 and 18' between the bearing surfaces 13 of the plates. In placing the plates in the box in this manner, I arrange them so that they are staggered as indicated in Fig. 4, and the insulated strips 17 are of a nature such that they not only space the plates to provide gaps therebetween, but they effectively pack the edges of the plates so that a liquid passing downwardly through the box follows a path generally indicated by the arrows in Fig. 4 back and forth between the successive plates of the series and is discharged through an opening 20 in the removable side 17, such opening being provided with an adjustable gate 21.

The bottom of the cell 16 is furnished with metallic strips 22 and 22' which are connected by suitable means with the negative pole of a source of direct electric current indicated at S. These strips serve as supports for the lower graphite carbon plate 11L and the ground or finished bearing margins 13, which rest directly upon the strips, thus make electrical contact therewith.

In positioning the plates in the cell, the insulating strips are placed on the ground edges of the bottom plate 11L and the next plate is positioned with its edges on these strips and with its metallic coated surface uppermost, the lower surface thereof being uncoated. This procedure is followed until the desired number of plates have been placed in the cell and the top or positive plate is formed of uncoated graphite or carbon.

To complete the cell in this form of my invention, I employ a pair of upright carbon plates 23 and 23' which rest on the bearing edges 13 of the top plate, such plates being connected through a suitable conductor 24 with the positive side of the source of the electrical potential S.

For the purpose of sealing the plate assembly within the cell, I may employ a hollow cover frame of the type indicated at 25, such frame having its edges bearing against the top of the cell and having inwardly extending flanges 26 which engage the tops of the plates 23 and 23'. This cover frame may be sealed or locked to the four sides of the cell by means of suitable locks or simply by placing wires 27 through eyes 28 and 28', the wires being provided with pressed metallic seals indicated by reference numeral 29.

In operation, the finely divided ore, suspended in a suitable dilute electrolyte, such as a solution of sodium chloride or natural ground water which always contains ionized salts, is passed into the top of the cell at such rate that the level of the electrolyte in the cell stands constantly above the upper positive plate, the maintenance of such level being further regulated by adjustment of the gate 21 at the discharge opening 20. The electrolyte, in passing downward through the cell, completely fills the spaces or gaps between the adjacent plates, thus establishing and maintaining electric and electrolytic contact between all of the plates so that the apparatus functions as a series electrolytic cell. During operation, a direct current of electricity passes through the cell and by its action serves to maintain the amalgamating surfaces of the plates at negative potential so that they constitute cathodes of the cell. These surfaces are thereby maintained in a highly active condition for causing or assisting in the amalgamation of any metallic particles contained in the ore. It has been found that a current-density of 10 or 15 amperes per square foot of area of the negative amlagamated surface of the plates is amply sufficient for the purpose.

In order to make a "clean up", that is, to remove the rich amalgam from the plates after this step of the process has been completed, the plates are removed from the cell and in the event they were first coated with an electro-deposit of zinc, they are immersed in a solution of hydrochloric acid of suitable strength, the zinc thereby being dissolved and the rich amalgam falling to the bottom of the vessel in which the acid is contained. The stripped plates are removed from the acid, thoroughly washed with water, and recoated and amalgamated for further use. The rich amalgam is also removed from the acid, washed with water, dried, and retorted in the ordinary manner or otherwise treated for the extraction and recovery of the valuable metals which it contains.

When the graphite or carbon plates have been coated with a metal other than zinc, the reagent used is one which will attack that metal and which will not attack the precious metal in the amalgam. For example, if copper has been used as the base coat, the plates may be immersed in a more or less dilute solution of nitric acid. The plates may also be stripped by electrolysis, that is, by using them as anodes and subjecting them to the action of an electric current in a properly selected electrolyte.

Some of the advantages possessed by the process and apparatus contemplated by this invention are that an amalgamated plate may be used which is practically chemically pure and that such plate may be maintained in this condition by the application thereto of the electric current. Furthermore, there is an additional efficiency developed through the reducing action of the current on any coated metallic particles which come in contact with the amalgamated plates.

Another great advantage of the process is the ease with which the rich amalgam may be removed from the plates and finally the fact that the apparatus is self contained and may be operated under seal or lock.

It is to be understood that, while I have herein described and illustrated one preferred form of my invention, the invention is not to be limited by the precise construction described herein, but includes within its scope whatever changes fairly come within the spirit of the appended claims.

I claim as my invention:

1. For use in the recovery of a metal from its ore: a carbon plate; and a mercury alloy coating on a surface of said plate.

2. For use in the recovery of a metal from its ore: a carbon plate having an electro-deposited metal coating on one surface thereof, said coating being alloyed with mercury, another surface of said carbon plate being uncoated.

3. For use in recovering a metal from its ore: a carbon plate having a corrugated surface; and a metal coating on said surface, said coating comprising a chemically active metal and an alloy of mercury.

4. For use in recovering a metal from its ore: a carbon plate having a corrugated surface; a chemically active metal coating on said surface; and an amalgamated surface on said metal coating.

5. For use in the recovery of a metal from its ore: a series cell of the class described embodying: a box; a plurality of spaced carbon plates in said box arranged to be connected in an electric circuit so as to have oppositely disposed cathode and anode surfaces; and mercury alloy coatings on the cathode surfaces of said plate.

6. For use in the recovery of a metal from its ore, a series cell having a plurality of plates formed of a nonmetallic electrically conductive material, and mercury alloy coatings on the alternate surfaces of said plates.

7. For use in the recovery of a metal from its ore, a series cell having a plurality of plates formed of a nonmetallic electrically conductive material, coatings on the alternate surfaces of said plates, said coatings comprising an electrically conductive material which has an affinity for the metal in said ore; and means for applying electric potential across the plates in said cell.

8. A cell for recovering metal from ore embodying: a case; a plurality of nonmetallic electrically conductive plates mounted in said case and arranged to be connected in an electric circuit so as to have oppositely disposed cathode and anode surfaces; insulating spacers mounted between said plates and forming gaps therebetween; metallic coatings on the alternate surfaces of said plates, said coatings being composed of metal which has an affinity for the metal in said ore; and means for applying electric potential across the plates in said cell.

9. A cell for recovering metal from ore of the class described embodying: an upright case formed of insulating material; a plurality of substantially horizontal electrically conductive plates mounted in said case in staggered relation with each other and arranged to be connected in an electric circuit so as to have oppositely disposed cathode and anode surfaces; insulating means between the edges of said plates for holding same in spaced relation with each other; coatings formed of metal having an affinity for the metal in said ore on the alternate surfaces of said plates; and means for applying electric potential across the plates in said cell.

10. A cell for extracting metal from ore of the class described embodying: an upright case; a plurality of substantially horizontal carbon plates mounted in said case in staggered relation with each other; insulating means between the edges of said plates for holding same in spaced relation with each other; a source of electrical potential; means connecting said plates across said source of potential whereby said plates have oppositely disposed cathode and anode surfaces, metallic coatings having an affinity for the metal in said ore on the cathode surfaces of said plates, said case having an outlet opening in its bottom portion; and an adjustable gate on said outlet opening.

11. For use in the recovery of a metal from its ore: a cell having spaced plates therein and amalgam coatings on the surfaces of said plates, said plates being composed of non-metallic electrically conductive material which is chemically inert with respect to a reagent which will dissolve said amalgam; and means for applying electric potential across the plates in said cell.

12. The method of extracting a metal from its ore which includes: electrolytically depositing said metal upon the amalgamated surface of a metal coated carbon plate; and then immersing the plate in a reagent which will react chemically with and dissolve the metal coating on said plate but which will not attack the material of the plate, the recovered metal or the mercury of the amalgam.

13. The method of extracting a metal from its ore which includes: electrolytically depositing said metal from said ore onto the amalgamated surface of a metallic coating formed on a non-metallic, electrically conductive plate; and then immersing said plate in a reagent which will react chemically with and dissolve the coating metal but which will not attack the plate or the recovered metal.

14. The method of extracting a precious metal from its ore which includes: depositing said metal from the ore onto the amalgamated surface of a zinc coating formed on a carbon plate; and then immersing said plate in a solution of hydrochloric acid.

15. The method of extracting a precious metal from its ore which includes: forming an amalgam coating on a carbon plate; depositing said precious metal from its ore onto said amalgam coating; then stripping the deposited metal from said plate by immersing said plate in an electrolytic bath, connecting same as an anode in an electric circuit and subjecting same to the action of an electric current.

16. In a cell for extracting metal from ore of the class described, the combination of: a pair of carbon plates; insulating means for supporting said plates in spaced relation with each other; means for applying electric potential across said plates so that their oppositely disposed surfaces constitute the cathode and anode respectively of an electrolytic couple; and a mercury amalgam coating on the cathode surface on one plate facing the anode surface on the other plate.

FRANK C. AXTELL.